United States Patent
Kim et al.

(10) Patent No.: US 12,455,829 B2
(45) Date of Patent: Oct. 28, 2025

(54) MEMORY DEVICE INCLUDING ADDRESS TABLE AND OPERATING METHOD FOR MEMORY CONTROLLER

(71) Applicant: SAMSUNG ELECTRONICS CO., LTD., Suwon-si (KR)

(72) Inventors: Chinam Kim, Suwon-si (KR); Taekyeong Ko, Suwon-si (KR); Namhyung Kim, Suwon-si (KR); Dohan Kim, Suwon-si (KR); Byeongnoh Kim, Suwon-si (KR); Bobae Kim, Suwon-si (KR); Changmin Lee, Suwon-si (KR); Kyeongjin Cho, Suwon-si (KR); Insu Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 52 days.

(21) Appl. No.: 18/140,974

(22) Filed: Apr. 28, 2023

(65) Prior Publication Data
US 2023/0350809 A1 Nov. 2, 2023

(30) Foreign Application Priority Data
May 2, 2022 (KR) .................... 10-2022-0054447

(51) Int. Cl.
*G06F 12/10* (2016.01)
(52) U.S. Cl.
CPC .................... *G06F 12/10* (2013.01)
(58) Field of Classification Search
None
See application file for complete search history.

(56) References Cited

U.S. PATENT DOCUMENTS

| | | |
|---|---|---|
| 6,262,938 B1 | 7/2001 | Lee et al. |
| 7,167,946 B2 | 1/2007 | Osborne |
| (Continued) | | |

FOREIGN PATENT DOCUMENTS

| | | |
|---|---|---|
| EP | 3220274 | 3/2022 |
| KR | 1020030097700 | 12/2003 |
| (Continued) | | |

OTHER PUBLICATIONS

Extended European Search Report in European Appln. No. 23171026.0, mailed on Aug. 31, 2023, 8 pages.

*Primary Examiner* — Ryan Bertram
*Assistant Examiner* — Edmund H Kwong
(74) *Attorney, Agent, or Firm* — Fish & Richardson P.C.

(57) ABSTRACT

A memory device includes; a memory cell array, and a command/address decoder including a buffer memory, a first decoding logic circuit configured to decrypt command/address information, and a second decoding logic circuit configured to decrypt an address table. The command/address decoder is configured to decrypt a first command received from a memory controller through the first decoding logic circuit to obtain a table synchronization command, decrypt data received from the memory controller after a predefined latency from receipt of the first command through the second decoding logic circuit to obtain an address table, store the address table in the buffer memory, decrypt a second command received from the memory controller through the first decoding logic circuit to obtain a table-based command and index information associated with the address table, and execute the table-based command with respect to an address corresponding to the index information.

15 Claims, 16 Drawing Sheets

(56) References Cited

U.S. PATENT DOCUMENTS

| | | | |
|---|---|---|---|
| 7,310,717 B2 | 12/2007 | Nishino et al. | |
| 7,328,286 B2 | 2/2008 | Vinnemann | |
| 8,250,333 B2 | 8/2012 | Gorobets et al. | |
| 8,966,151 B2 | 2/2015 | Zitlaw | |
| 9,158,620 B2 | 10/2015 | Sutardja et al. | |
| 9,530,468 B2 | 12/2016 | Halbert et al. | |
| 2002/0006243 A1 | 1/2002 | Longone | |
| 2010/0174869 A1* | 7/2010 | Gorobets | G06F 12/1027 |
| | | | 711/170 |
| 2016/0246672 A1* | 8/2016 | Yang | G06F 3/064 |
| 2019/0065107 A1* | 2/2019 | Prather | G11C 7/1015 |
| 2021/0117315 A1* | 4/2021 | Takubo | G06F 12/0246 |
| 2021/0390989 A1* | 12/2021 | Song | G11C 7/1057 |
| 2022/0358051 A1* | 11/2022 | Fu | G06F 12/1054 |

FOREIGN PATENT DOCUMENTS

| | | |
|---|---|---|
| KR | 20160122483 A | 10/2016 |
| KR | 20190006314 A | 1/2019 |
| KR | 102030126 | 10/2019 |
| KR | 20200011136 A | 2/2020 |
| KR | 20200123898 A | 11/2020 |
| KR | 20210013647 A | 2/2021 |
| KR | 20210155270 A | 12/2021 |

* cited by examiner

FIG. 4

| FUNCTION | CHIPSELECT | Abbr | WHETHER PARTIAL SYNC IS PERFORMED | WHETHER HEADER IS INCLUDED | ADDITIONAL NECESSARY INFORMATION |
|---|---|---|---|---|---|
| FULL TABLE SYNC | H | TBSYN | 0 | DON'T CARE | TBD |
| PARTIAL TABLE SYNC | H | TBSYN | 1 | 0 | OFFSET INFORMATION |
| CUSTOM TABLE SYNC | H | TBSYN | 1 | 1 | TBD |

FIG. 6

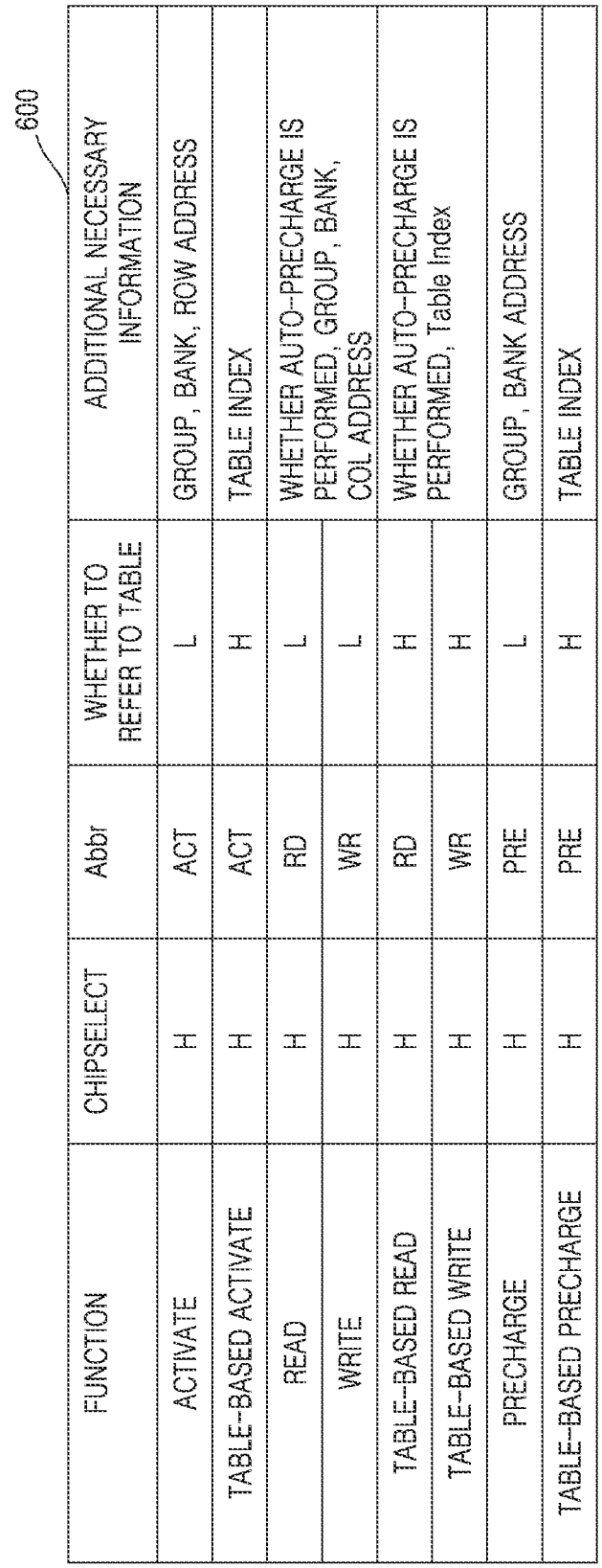

| FUNCTION | CHIPSELECT | Abbr | WHETHER TO REFER TO TABLE | ADDITIONAL NECESSARY INFORMATION |
|---|---|---|---|---|
| ACTIVATE | H | ACT | L | GROUP, BANK, ROW ADDRESS |
| TABLE-BASED ACTIVATE | H | ACT | H | TABLE INDEX |
| READ | H | RD | L | WHETHER AUTO-PRECHARGE IS PERFORMED, GROUP, BANK, COL ADDRESS |
| WRITE | H | WR | L | |
| TABLE-BASED READ | H | RD | H | WHETHER AUTO-PRECHARGE IS PERFORMED, Table Index |
| TABLE-BASED WRITE | H | WR | H | |
| PRECHARGE | H | PRE | L | GROUP, BANK ADDRESS |
| TABLE-BASED PRECHARGE | H | PRE | H | TABLE INDEX |

FIG. 8A

| FUNCTION | CHIPSELECT | Abbr | LATENCY IDENTIFIER | ADDITIONAL NECESSARY INFORMATION |
|---|---|---|---|---|
| TABLE SYNC W/ READ LATENCY | H | TBSYN | 11 | TBD |
| TABLE SYNC W/ WRITE LATENCY | H | TBSYN | 10 | TBD |
| TABLE SYNC W/ NO LATENCY | H | TBSYN | 01 | TBD |

MEMORY DEVICE INCLUDING ADDRESS TABLE AND OPERATING METHOD FOR MEMORY CONTROLLER

CROSS-REFERENCE TO RELATED APPLICATION

This application claims priority under 35 U.S.C. § 119 to Korean Patent Application No. 10-2022-0054447 filed on May 2, 2022 in the Korean Intellectual Property Office, the subject matter of which is hereby incorporated by reference in its entirety.

BACKGROUND

The inventive concept relates to memory devices, and more particularly to a memory devices including an address table, as well as operating methods for memory controllers.

The quantity of data processed by electronic devices, such as smartphones, has generally increased. Accordingly, memory devices incorporated in electronic devices are required to provide relatively high data storage capacity and high bandwidth data operations. To this end, memory devices providing high data capacity and high bandwidth are usually characterized by increased operating frequencies.

However, increased operating frequency for constituent memory device(s) increases the standby power consumption of the electronic device. And although clock domain separation has been introduced to reduce standby power consumption, configurations including a data bus operating at high frequency and a command bus operating at low frequency have proved incapable of gapless data communications operation even in configurations providing sufficient memory resources.

SUMMARY

Embodiments of the inventive concept provide memory devices capable of storing an address table by which a memory device may be synchronized with a memory controller, thereby improving performance and overcoming possible degradation due to bandwidth shortage(s) in transferring commands and addresses. Embodiments of the inventive concept also provide operating methods for memory controllers associated with the foregoing memory devices.

According to an aspect of the inventive concept, there is provided a memory device including; a memory cell array, and a command/address decoder including a buffer memory, a first decoding logic circuit configured to decrypt command/address information, and a second decoding logic circuit configured to decrypt an address table. The command/address decoder is configured to decrypt a first command received from a memory controller through the first decoding logic circuit to obtain a table synchronization command, decrypt data received from the memory controller after a predefined latency from receipt of the first command through the second decoding logic circuit to obtain an address table, store the address table in the buffer memory, decrypt a second command received from the memory controller through the first decoding logic circuit to obtain a table-based command and index information associated with the address table, and execute the table-based command with respect to an address corresponding to the index information.

According to an aspect of the inventive concept, there is provided a memory device including: a memory cell array, and a command/address decoder including a buffer memory configured to store an address table and a decoding logic circuit configured to decrypt a command and corresponding address information. The command/address decoder is configured to decrypt a command received from a memory controller through the decoding logic circuit to obtain a table-based command, determine whether the table-based command refers to an address table with reference to a first field of the table-based command, upon determining that the table-based command refers to the address table, decrypt the address information through the decoding logic circuit to obtain index information associated with the address table, and obtain at least one of a bank, a row address, and a column address corresponding to the index information and in relation to a type of the table-based command.

According to an aspect of the inventive concept, there is provided an operating method for a memory device. The operating method includes; receiving a first command and corresponding address information from a memory controller, decrypting the first command to obtain a table synchronization command, decrypting data received from the memory controller after a predefined latency from receipt of the first command to obtain an address table, storing the address table in a buffer memory, receiving a second command from the memory controller, decrypting the second command to obtain a table-based command and corresponding index information associated with the address table, and executing the table-based command with respect to an address corresponding to the index information.

According to an aspect of the inventive concept, there is provided a memory controller including; a scheduler configured to generate an address sub-table indexing addresses and encode the sub-table to generate an encoded sub-table, a command generation circuit configured to generate a table synchronization command in accordance with a control signal received from the scheduler, and a global address table storing a plurality of sub-tables respectively associated with a plurality of volatile memory devices, wherein the scheduler is further configured to detect an event initiating update of at least one of the plurality of sub-tables, generate the table synchronization command and provide the table synchronization command to one of the plurality of volatile memory devices upon detecting the event, and provide the encoded sub-table to one of the plurality of volatile memory devices after a predefined latency has elapsed from a time at which the table synchronization command is provided.

BRIEF DESCRIPTION OF THE DRAWINGS

Embodiments of the inventive concept will be more clearly understood from the following detailed description taken in conjunction with the accompanying drawings in which:

FIG. 4 illustrates a table for table synchronization commands in some embodiments;

FIG. 6 is a table illustrating an example of index-based commands in some embodiments;

FIG. 8A is a table illustrating various latencies of table synchronization commands in some embodiments;

DETAILED DESCRIPTION

Throughout the written description and drawings, like reference numbers and labels are used to denote like or similar elements, components, systems, features and/or method steps.

Figure 1:
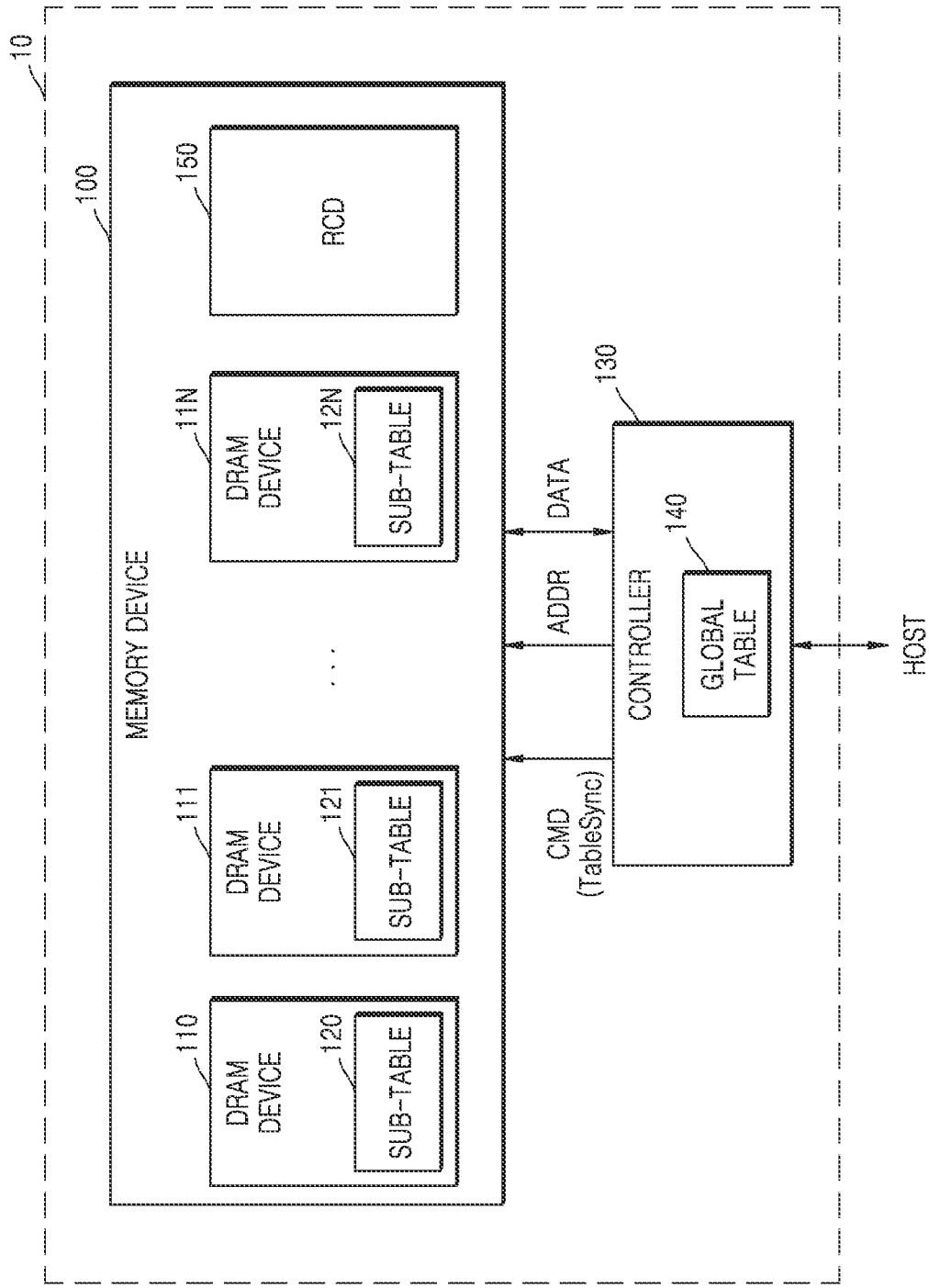
FIG. 1 is a block diagram illustrating a memory system in some embodiments.

(FIG. 1 is a block diagram illustrating a memory system 10 according to embodiments of the inventive concept. Referring to FIG. 1, the memory system 10 may generally include a memory device 100 and a memory controller 130.

The memory controller 130 may be used to control overall operation of the memory system 10. For example, the memory controller 130 may apply various commands (CMD) to the memory device 100 that control operation of the memory device 100. The memory controller 130 may control the input and/or output (I/O) of data between a host (HOST) and the memory device 100. For example, the memory controller 130 may communicate (e.g., send and/or receive) one or more command(s) (hereafter regardless of number or type, "command"), one or more address(es) (hereafter regardless of number or type, "address") (ADDR) and/or data (e.g., read data or write data) (DATA) with the memory device 100 in response to a request received from the host in order to perform a memory access operation (e.g., a program (or write) operation, a read operation, an erase operation, a housekeeping operation, etc.).

In some embodiments, a path through which the command and the address are communicated may be different from a path through which the data is communicated. For example, the command and address may be communicated to the memory device 100 through a command/address (C/A) bus, while the data may be communicated with the memory device 100 through a data bus.

In some embodiments, the memory device 110 may include a register clock driver 150 configured to receive a control signal from the memory controller 130. For example, the register clock driver 150 may receive a clock signal and a C/A signal from the memory controller 130. The register clock driver 150 may provide the received clock signal and C/A signal to at least one of a plurality of volatile memory devices 110, 111 . . . to 11N (e.g., a plurality of dynamic random access memory (DRAM) devices).

In FIG. 1, a plurality of DRAM devices is assumed, but the scope of the inventive concept is not limited thereto. For example, one or more of the plurality of volatile memory devices 110 to 11N might alternately be implemented using a Synchronous DRAMs (SDRAM), a Double Data Rate SDRAMs (DDR SDRAM), a Low Power Double Data Rate SDRAM (LPDDR SDRAM), a Graphics Double Data Rate SDRAM (GDDR SDRAM), a DDR2 SDRAM, a DDR3 SDRAM, a DDR4 SDRAM, a DDR5 SDRAM, a Wide I/O DRAM, a High Bandwidth Memory (HBM), and/or a Hybrid Memory Cube (HMC).

In some embodiments, each of the plurality of DRAM devices 110 to 11N may be used to store a corresponding sub-table (e.g., a first sub-table 120 associated with a first DRAM device 110, a second sub-table 121 associated with a second DRAM device 111, etc.). Each sub-table may be variously defined as a data structure. However, in some embodiments, each sub-table may be implemented a table configured to store an index mapped with address information of the corresponding DRAM device. For example, each sub-table may be a look-up table.

In some embodiments, the memory controller 130 may store a global table 140. In order for the memory controller 130 to provide an index-based command to the memory device 100, it is necessary to know which address is mapped to which index for each of the plurality of DRAM devices 110 to 11N. Accordingly, the global table 140 may be a periodically-updated table that integrates the information contained in all of the sub-tables respectively associated with the plurality of DRAM devices 110 to 11N. That is, the global table 140 may be an all-inclusive copy of the plurality of sub-tables 120 to 12N.

In some embodiments, the memory controller 130 may communicate one or more commands that result in a synchronizing of an address table associated with the memory device 100. Here, the address table may include various address information. For example, all or a portion of the address table may be generated, communicated to, and then stored in a designated DRAM device as the sub-table corresponding to the designated DRAM (e.g., the first sub-table 120 stored in the first DRAM device 110).

Thus, in some embodiments, the memory controller 130 may communicate a first command to the memory device 100, wherein the first command is a full address table synchronization (hereafter, "sync") command that synchronizes (e.g., updates or changes) the address table in relation to at least one of the plurality of DRAM devices 110 to 11N. Alternately, the memory controller 130 may communicate a partial sync command to the memory device 100 that synchronizes only identified portion(s) of at least one address table (e.g., the first sub-table 120) previously stored in relation to the plurality of DRAM devices 110 to 11N.

In some embodiments, the memory controller 130 may communicate various table-based commands to the memory device 100. More specifically, the memory controller 130 may communicate index information to the memory device 100 together with the table-based commands. Here, index information may be understood as specific type of "address information" stored in an address table (e.g., the global table 140 and/or at least one of sub-tables 120 to 12N). For example, the memory controller 130 may communicate an index-based read command (e.g., a command identifying a table based read operation) and corresponding index information. And in response to the index-based read command, the memory device 100 may read data stored at an address mapped to the index information and provide (or output) the read data to the memory controller 130.

Collectively or singularly, the command and associated address information received by the one or more of the plurality of DRAM devices 110 to 11N from the memory controller 130 may be generically referred to as "command/address information."

In some embodiments, the memory device 100 may be implemented as a memory module. For example, the memory device 100 may include the plurality of DRAM devices 110 to 11N, together with resistor clock driver (RCD) 150, mounted on (e.g., mechanically assembled and/or electrically connected) a printed circuit board (PCB).

Various connectors may be formed at regular intervals along one edge (e.g., a long side) of the PCB. When the memory module is subsequently inserted into a corresponding connection socket of a connecting device, the connectors may come into electrically contact with various pins provided in the socket in order to facilitate the communication of various signals (e.g., command signal(s), address signal(s), clock signal(s) and/or data signal(s)) between the memory device 100 and the connecting device.

In some embodiments, the plurality of DRAM devices 110 to 11N may have a data bus width of 4 bits (X4), 8 bits (X8), 16 bits (X16), or 32 bits (X32). For example, assuming the use of a X8 DRAM device, the DRAM device may communicate data to and/or receive data from the memory controller 130 through 8 I/O pins.

One or more of the plurality of DRAM devices 110 to 11N may perform a burst operation. Here, a basic unit of the burst operation may be referred to as a burst length or BL. In this regard, "burst length" denotes a number of continuous count of I/O at pin for processing a single request, for example, the burst length indicates a number of continuous write count during a burst write operation, or a number of continuous read count during a burst read operation. For example, further assuming that each of the plurality of DRAM devices 110 to 11N operates as a X8 device, and a burst length of 16, a corresponding "length of data I/O" (e.g., through a unit operation of each of the plurality of DRAM devices 110 to 11N) may be calculated in accordance with a data bus width (e.g., 8 bits) times the burst length (16), or 128 bits times the number of DRAM devices. Thus, in relation to the foregoing, illustrative example, the length of data I/O for the memory device 100—operating in accordance with a unit operation of each of the plurality of DRAM devices—may be equal to 128 bits times the number of DRAM devices included in the plurality of DRAM devices 110 to 11N.

Figure 2:
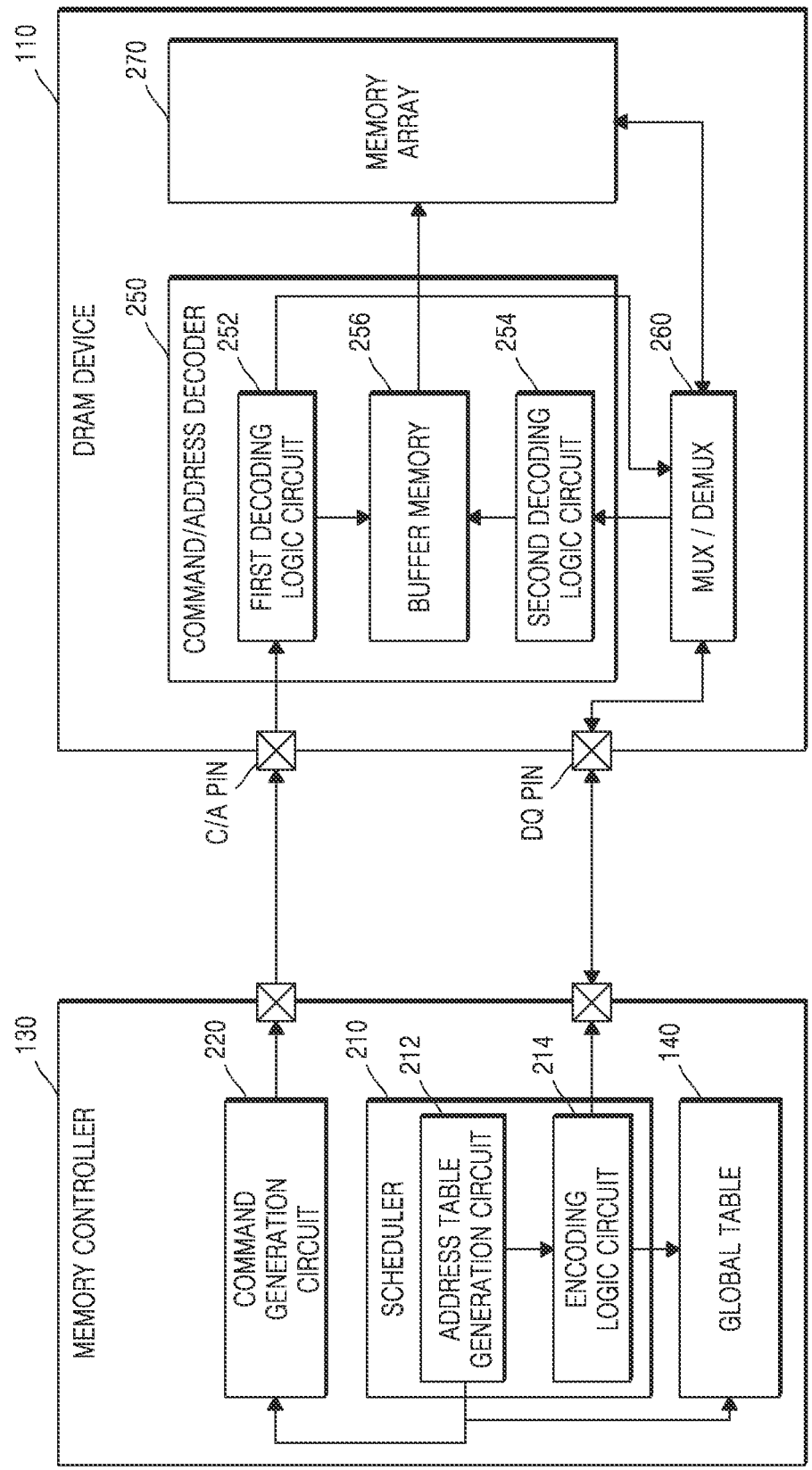
FIG. 2 is a block diagram illustrating a dynamic random access memory (DRAM) device and a memory controller in some embodiments.

FIG. 2 is a block diagram further illustrating the first DRAM device 110 and the memory controller 130 of FIG. 1. Those skilled in the art will appreciate that each of the plurality of DRAM devices 110 to 11N of FIG. 1 may be similarly configured in relation to the first DRAM device 110.

Referring to FIG. 2, the first DRAM device 110 may include a memory array 270 including a plurality of memory cells, a command/address (C/A) decoder 250, and a multiplexer/demultiplexer (MUX/DEMUX) 260.

In some embodiments, the C/A decoder 250 may be used to decode command(s) received from an external source (e.g., the memory controller 130) and generate one or more internal signals used to variously drive the first DRAM device 110. For example, in response to a read command, the C/A decoder 250 may generate various internal signal(s) that cause the first DRAM device 110 to read data from the memory array 270. Here, the reading of read data by the first DRAM device 110 may include generating error-corrected read using, for example, an error connection code (ECC) engine (not shown in FIG. 2).

In some embodiments, the C/A decoder 250 may include a first decoding logic circuit 252, a buffer memory 256, and a second decoding logic circuit 254. The first decoding logic circuit 252 may be configured to receive one or more command(s) (hereafter referred to simply as "command") from the memory controller 130 and decode the command. For example, the first decoding logic circuit 252 may receive the command through a designated C/A pin. In this regard, the first decoding logic circuit 252 may receive a table synchronization command from the memory controller 130 through the C/A pin. The first decoding logic circuit 252 may then decode the table synchronization command and obtain information indicating a predetermined delay time. The first decoding logic circuit 252 may generate one or more internal control signals used to variously drive the first DRAM device 110. For example, the first decoding logic circuit 252 may communicate control signal(s) to the MUX/DEMUX 260 in accordance with the delay time.

Further in this regard, the MUX/DEMUX 260 may receive "address table information" (e.g., as data communicated through a designated data pin (DQ)) from the memory controller 130, wherein the address table information defines an address table. Accordingly, upon receiving the address table information from the memory controller 130, the MUX/DEMUX 260 may provide the address table information to the second decoding logic circuit 254. Here, the address table information may include data encoded by a table including an address and an index. For example, the MUX/DEMUX 260 may provide the received address table information to the second decoding logic circuit 254 in response to receiving a control signal from the first decoding logic circuit 252, wherein the control signal may be a signal controlling operation of the MUX/DEMUX 260 to provide the data corresponding to the address table information received through the DQ pin to the second decoding logic circuit 254 without providing such data to the memory array 270.

In this manner, the second decoding logic circuit 254 may operate such that the first DRAM device 110 may obtain an address table. For example, the MUX/DEMUX 260 may communicate the data corresponding to the address table information, as received from the memory controller 130, to the second decoding logic circuit 254. Then, the second decoding logic circuit 254 may obtain the address table by decryption on the data corresponding to the address table information. And thereafter, the second decoding logic circuit 254 may store the address table in the buffer memory 256. The address table stored in the buffer memory 256 may correspond to the first sub-table 120 of FIG. 1.

Referring to FIG. 2, the memory controller 130 may include a command generation circuit 220, a scheduler 210 including an address table generation circuit 212 and an encoding logic circuit 214, and the global table 140.

In some embodiments, the scheduler 210 may perform scheduling of commands to-be-communicated to the first DRAM device 110. The address table generation circuit 212 included in the scheduler 210 may be used to generate at least one sub-table in accordance with scheduling information associated with the scheduler 210. For example, assuming a course of operation wherein the scheduler 210 schedules consecutive read commands 10 times, the address table generation circuit 212 may generate a sub-table including target addresses for the read commands to-be-communicated following a predetermined delay. Here, the predetermined delay may correspond to a time required to communicate data by encoding the address table to the first DRAM device 110 once the memory controller 130 has provided the table synchronization command to the first DRAM device 110. Thereafter, the address table generation circuit 212 may provide the generated sub-table to the encoding logic circuit 214. The address table generation circuit 212 may provide a control signal to the command generation circuit 220 in response to the generation of the sub-table.

In some embodiments, the command generation circuit 220 may provide a plurality of commands to the first DRAM device 110 in response to the control signal. The plurality of commands may include a table synchronization command and a table-based command. For example, the control signal may be a signal provided from the address table generation circuit 212. The command generation circuit 220 may provide the table synchronization command to the first DRAM device 110 in response to the control signal provided from the address table generation circuit 212. Alternately, in another example, the command generation circuit 220 may receive a signal requesting read data from a host and then provide a read command controlling the first DRAM device 110 to retrieve the indicated read data. Hence, the command generation circuit 220 may determine whether to issue a normal command or the table-based command. For example, the command generation circuit 220 may determine whether an address of the requested read data has an address stored in the global table 140. When the address of the requested read data is already stored in the global table 140, the command generation circuit 220 may generate a table-based read command including only index information corresponding to the address and provide the table-based read command to the first DRAM device 110.

In some embodiments, the encoding logic circuit 214 may perform encoding on the address table transferred from the address table generation circuit 212. In this regard, a coding method of the encoding logic circuit 214 may be the same as a coding method of the second decoding logic circuit 254 of the DRAM device 110. For example, the encoding logic circuit 214 may perform encoding according to a base64 method, and the second decoding logic circuit 254 may perform decoding according to the base64 method.

In some embodiments, the global table 140 may be a table in which a number of sub-tables respectively stored in the plurality of DRAM devices 110 to 11N has been integrated. Therefore, when a new sub-table is generated or a partial address is changed in a previously generated sub-table, the address table generation circuit 212 may write information associated with the changed or added address(es) to the global table 140 in order to effectively synchronize address table(s) stored in relation to the plurality of DRAM devices 110 and a global address table stored in the memory controller 130.

Figure 3:
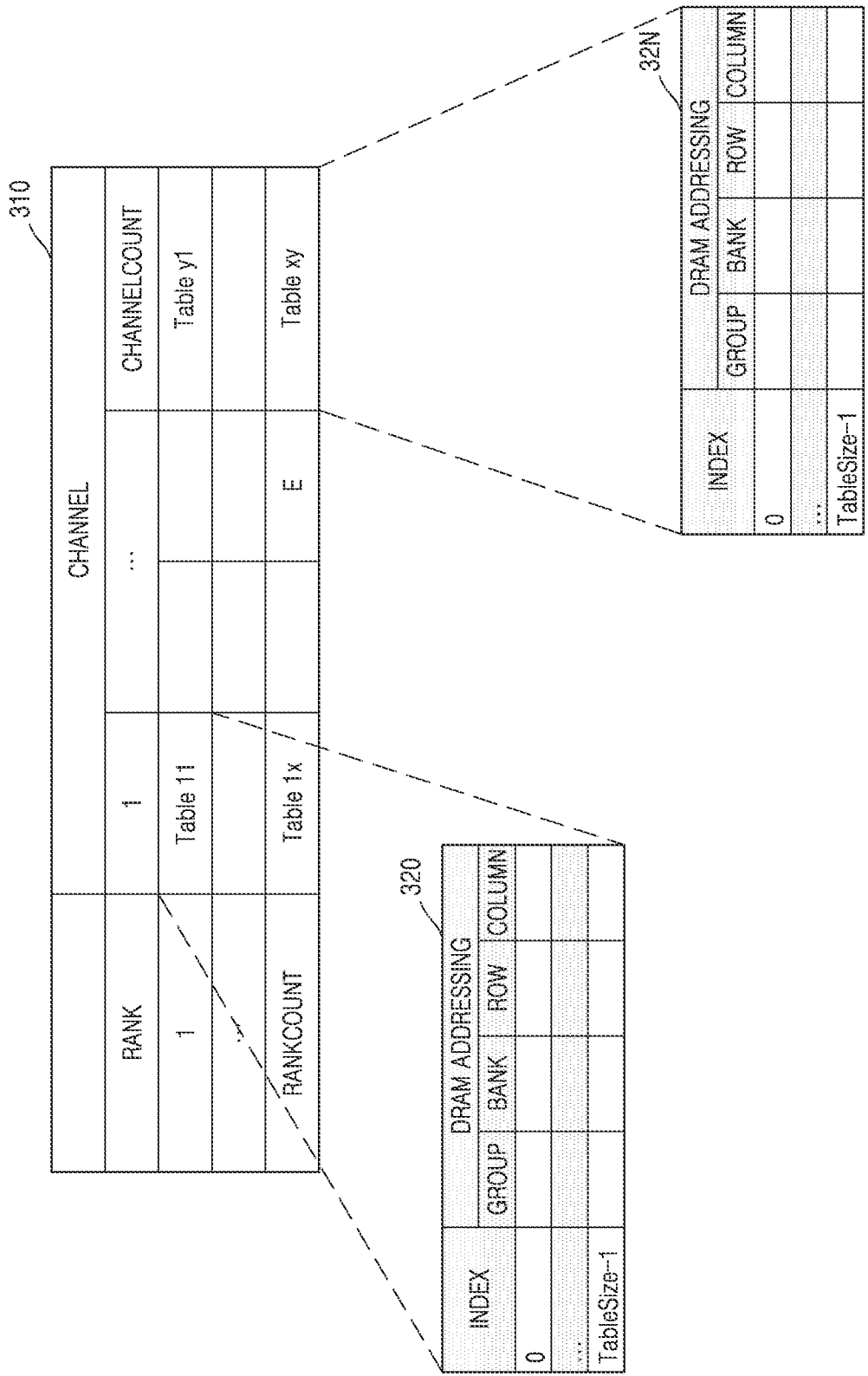
FIG. 3 illustrates an example of a global table of a memory controller in some embodiments.

FIG. 3 is a conceptual diagram illustrating in one example use of the global table 140 of the memory controller 130 according to embodiments of the inventive concept.

Referring to FIG. 3, a table 310 may correspond to the global table 140 of FIGS. 1 and 2, and sub-tables 320 to 32N of FIG. 3 may correspond to the sub-tables 120 to 12N of FIG. 1. In some embodiments, each sub-table may be used to store address information in accordance with a corresponding table size (TableSize). For example, assuming a table size of 8 for the first sub-table 320, 8 units of address information may be stored, wherein each "unit" may include a defined number of bits. In this regard, each unit of address information may include at least one address value associated with a memory group, a bank, a row, and/or a column.

Referring to FIG. 3, the global table 140 of the memory controller 130 may be used to store address information from all of the sub-tables 320(120) to 32N(11N) respectively associated with the plurality of DRAM devices 110 to 11N. Accordingly, assuming that the number of channels associated with the memory device 100 is 'y' and a number of ranks is 'x', the size of the global table 140 may be equal to [(x times y) times the number of sub-tables 320 to 32N].

FIG. 4 is a conceptual diagram illustrating a table listing exemplary table synchronization commands according to embodiments of the inventive concept.

Referring to FIGS. 2 and 4, a set of table synchronization commands may include: (1) a full table synchronization (sync) command used to fully synchronize (or update) an address table; a partial table sync command used to synchronize part (or a portion) of the address table; and a custom table sync command including a header and used to synchronize part of the address table. In this regard, the custom table sync command may be understood as a more particular type of partial table synchronization command.

In some embodiments, the command generation circuit 220 may be used to generate and provide the full table sync command to the first DRAM device 110. In this regard, the full table sync command may be used to store a new address table in the buffer memory 256 of the first DRAM device 110. Alternately, the full table sync command may be used to fully update (or change) an existing address table. In this regard, upon receiving a table sync command in the first DRAM 110, the first decoding logic circuit 212 may be used to distinguish (or identify) between the full table sync command and either the partial table sync or custom table sync by referencing a partial field (or first field) value indicating (or not indicating) a partial update. For example, when the partial field value is logically "low", the first DRAM device 110 may identify a received table sync command as the full table sync command.

The command generation circuit 220 may also be used to generate and provide the partial table sync command to the first DRAM device 110. Here, the partial table sync command may be used to update an indicated "partial sync region" of the address table stored in the buffer memory 256 of the first DRAM device 110. In some embodiments, the partial sync region may indicated using indexing information associated with the address table. In this regard, the indexing information may be used to logically divided the address table into a number of partial sync regions. Accordingly, the first DRAM device 110, upon receiving a table sync command may identify the received sync command as a partial table sync command by referring to the partial field value as well as a header field (or second) value. For example, if the partial field value is logically "high" and the header field value is low (i.e., indicating that a header is not included in the sync table command), then the first decoding logic circuit 252 may determine that the received sync command is a partial sync command.

Further, the first DRAM device 110 may identify the partial sync region associated with the partial sync command. Here, the partial sync region may include one or more address(es) requiring change among a plurality of partial sync regions constituting the address table. In some embodiments, an offset value stored in an additional information field may be used to indicate the partial sync region from among the plurality of partial sync regions. That is, the offset value may range from 0 to a maximum value obtained by dividing a table size for the address table by a partial sync region size value. For example, an offset value of "0" may be used to indicate a first partial sync region among the plurality of partial sync regions to be updated.

The command generation circuit 220 may also be used to generate and provide the custom table sync command to the first DRAM device 110. Here, the custom table sync command may be used to selectively update portion(s) of the address table stored in the buffer memory 256 of the first DRAM device 110. In this regard, the select update may be controlled by one or more indexes associated with the first DRAM 110. Accordingly, the first DRAM device 110, upon receiving a table sync command may identify the received sync command as a custom table sync command by referring to the partial field value as well as a header field value. For example, if the partial field value is high and the header field value is also high (i.e., indicating that a header is included in the sync table command), then the first decoding logic circuit 252 may determine that the received sync command is a custom sync command. And upon determining that the received sync command is a custom sync command, the first DRAM device 110 may decode the included header in order to identify the one or more indexes that will be used to selectively update in the address table.

Further in this regard, it should be noted that the partial table sync command need not include header information since the command generation circuit 220 only indicates a particular partial sync region to be updated using the offset value. Accordingly, in some embodiments, the first DRAM device 110 may identify that a header is not included in a received sync table command in accordance with a logical value of a second field value, as compared to a first field value associated with a full verses partial sync table command.

Thus, consistent with the foregoing examples, the command generation circuit 220 may distinguishingly generate one of the full table sync command, the partial table sync command and the custom table sync command using one or more field value setting(s) (e.g., the partial field value and/or the header field value of the illustrated example of FIG. 4). However, those skilled in the art will appreciate that the particular number of table synchronization commands, as well as their corresponding particular definition are matters of design choice, and the scope of the inventive concept is not limited to only the foregoing examples.

Figure 5A:
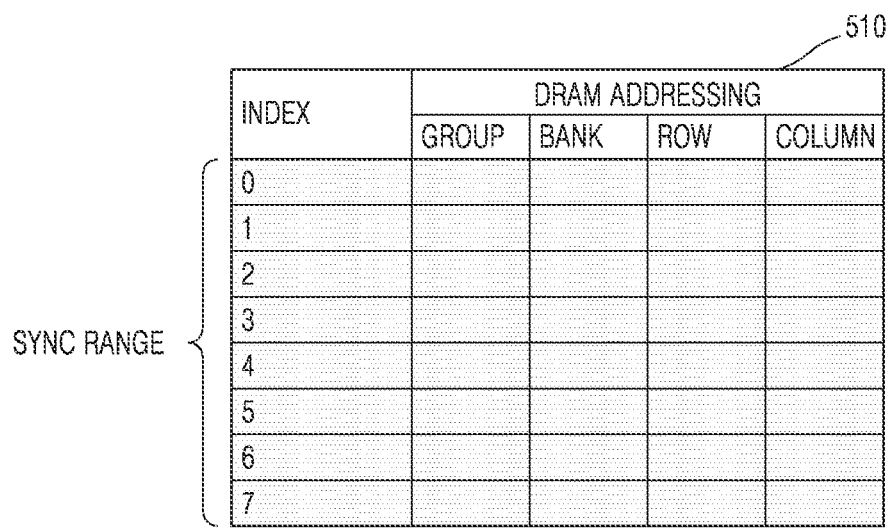
FIGS. 5A to 5C illustrate examples of synchronization of address tables in some embodiments.
Figure 5B:
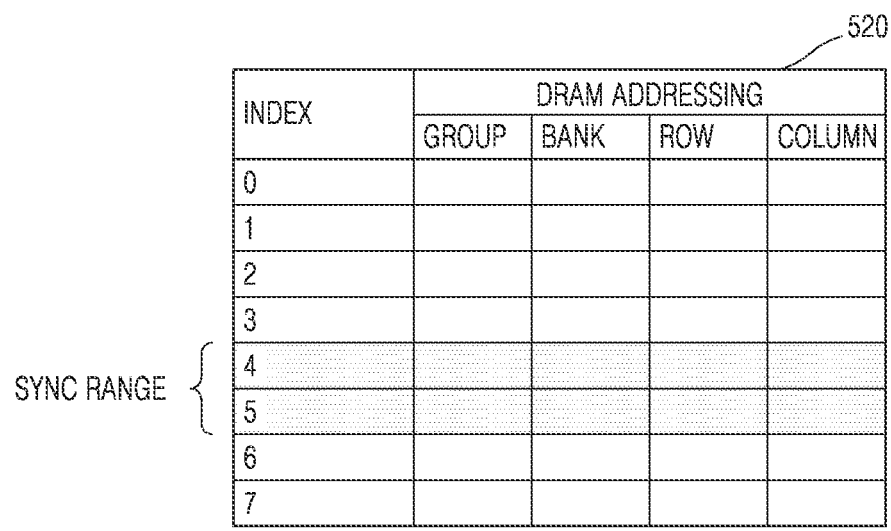
Figure 5C:
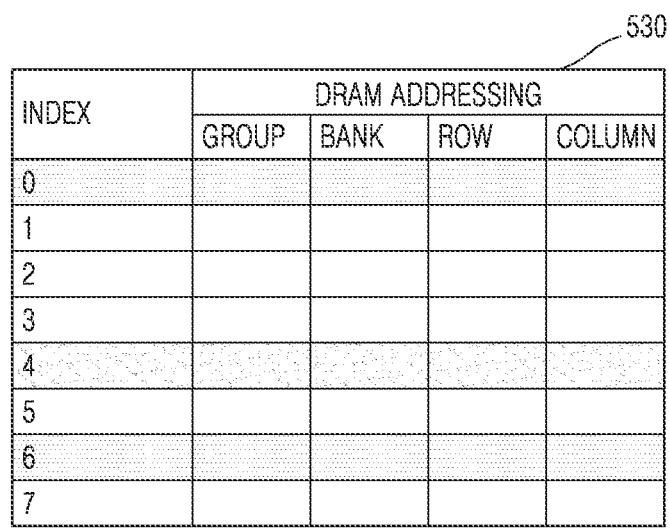

FIGS. 5A, 5B and 5C are respective conceptual diagrams further illustrating the synchronization of an address table according to embodiments of the inventive concept.

Referring to FIGS. 2, 4, 5A, 5B and 5C, each of a first address table 510, a second address table 520 and a third address table 530 may be understood as updating variations of an the address table stored in the buffer memory 256 of the first DRAM device 110.

Referring more specifically to FIG. 5A, the shaded region fully encompassing the first address table 510 represents a full update region corresponding to execution of a full table sync command by the first DRAM device 110 upon receiving the full table sync command from the memory controller 130. For example, when the first DRAM device 110 receives the full table sync command, the second decoding logic circuit 254 may write a full address table obtained through decoding to the buffer memory 256. That is, all of the address information associated with a full sync range (e.g., index 0 through index 7, inclusive) of the address table may be updated.

Referring more specifically to FIG. 5B, the shaded region partially highlighting a partial sync region of the second address table 520 represents a partial update region corresponding to execution of a partial table sync command by the first DRAM 110 upon receiving the partial table sync command from the memory controller 130. For example, when the first DRAM device 110 receives the partial table sync command, the second decoding logic circuit 254 may be used to identify an offset value of an additional field region through decoding. Thus, assuming an exemplary table size of 8, a partial sync region size of 2, and an offset value of 3, the second decoding logic circuit 254 may partially write (or rewrite) the address table in relation to index 4 and index 5 corresponding to a third partial sync region among partial sync regions of the second address table 520.

Further in relation to the above-described embodiment, offset(s) may be included in an additional field of the partial table sync command, as indicated by high or low logic values provided to the first DRAM device 110, but the scope of the inventive concept is not limited thereto. In other embodiments, for example, offset(s) may be encoded together with the address table and communicated to the first DRAM device 110 via a data bus. In such a case, the second decoding logic circuit 254 and the encoding logic circuit 214 may be used to identify that not only the address table, but also the offset(s) are present for encoding/decoding. Further in this regard, encoding/decoding methods performed by the second decoding logic circuit 254 and the encoding logic circuit 214 may be substantially the same.

Referring more specifically to FIG. 5C, the shaded regions of the third address table 530 indicate updated regions of the first DRAM device 110, as indicated by a custom table sync command received from the memory controller 130. For example, when the first DRAM device 110 receives the custom table sync command, the second decoding logic circuit 254 may decode a header and obtain one or more index value(s). For example, in the illustrated example of FIG. 5C, it is assumed that header includes three values; index 0, index 4, and index 6. Thus, the DRAM device 110 may selectively update address information corresponding to index 0, index 4, and index 6, as indicated by the header.

FIG. 6 is a conceptual diagram illustrating a table 600 listing examples of index-based commands according to embodiments of the inventive concept.

Referring to FIGS. 2 and 6, the table 600 lists both index-based commands and normal commands. Here, the term "normal commands" denotes commands other than index-based commands (i.e., commands not based on index information associated with an address table).

Certain commands designated "ACT" and variously used to activate specific row(s) of memory cells in the memory array 270 may be either an index-based command or a normal command. Thus, in some embodiments, the memory controller 130 may add a field indicating whether to refer to a table in distinguishing whether a command is an index-based command or a normal command. For example, in the case that a command designated "ACT" is a normal command, the field indicating whether to refer to the table may be low. That is, "ACT" of the normal command may be communicated together with information specifying an address to be activated without referring to an address corresponding to an index included in the address table. For example, "ACT" of the normal command may be communicated together with memory group information, information indicating a bank, and information indicating a specific row. Alternately, in the case of "ACT" of the index-based command, the field indicating whether to refer to the table may be high. That is, "ACT" of the index-based command may indicate activation of the address corresponding to the index included in the address table. When "ACT" of the index-based command is communicated, table index information indicating an index associated with the address table may also be communicated. The first DRAM device 110 may identify an index of an order indicated by the table index information, obtain memory group information, and bank and row addresses corresponding to the identified index of the order in the address table, and activate the obtained addresses.

Certain commands designated "RD" and requesting output of specific data may be either an index-based command or a normal command. As before, the memory controller 130 may add the field indicating whether to refer to the table in order to distinguish whether the command is an index-based command or a normal command. For example, in the case of "RD" of the normal command, the field indicating whether to refer to the table may low. That is, "RD" of the normal command may be generated when requesting output data stored in an address different from the address included in the address table. When "RD" of the normal command is communicated, information specifying the address may be transferred together. For example, "RD" of the normal command may be communicated together with memory group information, information indicating which bank it is, information indicating which column it is, and information indicating whether auto-precharge is performed. For another example, in the case of "RD" of the index-based command, the field indicating whether to refer to the table may be high. That is, "RD" of the index-based command may indicate a data output with respect to the address corresponding to the index included in the address table. When "RD" of the index-based command is communicated, table index information indicating which index it is in the address table and the information indicating whether auto-precharge is performed may be transferred together. The first DRAM device 110 may identify an index of an order indicated by the table index information, and perform data read with respect to a memory group, bank and column addresses corresponding to the identified index of the order in the address table.

Certain commands designated "WR" and requesting writing of specific data may be either an index-based command or a normal command. The memory controller 130 may add the field indicating whether to refer to the table and distinguish whether the command is an index-based command or a normal command. For example, in the case of "WR" of the normal command, the field indicating whether to refer to the table may be low. That is, "WR" of the normal command may be generated when write data is to be written to an address different from the address included in the address table. When "WR" of the normal command is communicated, information specifying an address to which the write data is to be written may be transferred together. For example, "WR" of the normal command may be communicated together with memory group information, information indicating which bank it is, information indicating which column it is, and the information indicating whether auto-precharge is performed. For another example, in the case of "WR" of the index-based command, the field indicating whether to refer to the table may be high.

Certain commands designated "RD" and indicating an index-based command may further indicate execution of a program with respect to the address corresponding to the index included in the address table. Thus, when "WR" of the index-based command is communicated, table index information indicating an index in the address table and the information indicating whether auto-precharge should be performed may be communicated together. The first DRAM device 110 may identify an index of an order indicated by the table index information, and write data with respect to a group, bank and column addresses corresponding to the identified index of the order in the address table.

Certain commands designated "PRE" and indicating precharge may be an index-based command or a normal command. The memory controller 130 may add the field indicating whether to refer to the table and distinguish whether the command is an index-based command or a normal command. For example, in the case of "PRE" of the normal command, the field indicating whether to refer to the table may be low. That is, "PRE" of the normal command may be generated when requesting to precharge a bank not included in the address table. When "PRE" of the normal command is communicated, information specifying a bank address may be transferred together. For example, "PRE" of the normal command may be communicated together with memory group information and the bank address. Alternately, in the case of "PRE" of the index-based command, the field indicating whether to refer to the table may be high. That is, "RD" of the index-based command may indicate to precharge a bank corresponding to the index included in the address table. When "PRE" of the index-based command is communicated, table index information indicating an index in the address table may be communicated. The first DRAM device 110 may identify an index of an order indicated by the table index information, and precharge a memory group and a bank address corresponding to the identified index of the order in the address table.

Figure 7:
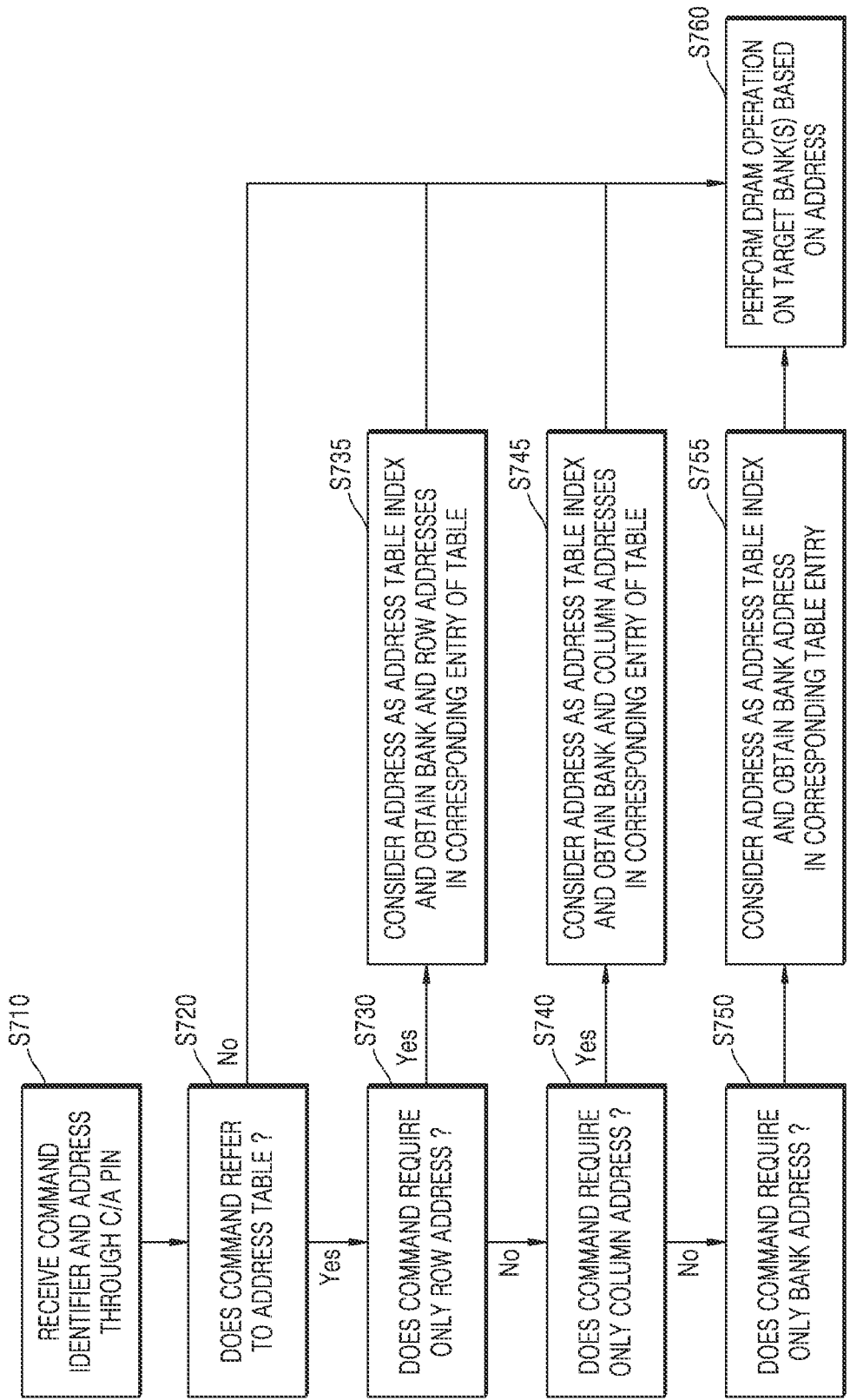
FIG. 7 is a flowchart illustrating an operating method of a DRAM device in some embodiments.

FIG. 7 is a flowchart illustrating in one example an operating method for the first DRAM device 110 of FIG. 2.

Referring to FIGS. 2, 6 and 7, the first DRAM device 110 may receive a command and an address through the C/A pin (S710). For example, when the command "ACT" is received through the C/A pin, the command "ACT" may be an index-based command or a normal command that does not use an index. In the case of the index-based command, the address may include index information rather than a target address to be activated. Accordingly, the first DRAM device 110 needs to identify whether a command is the index-based command or the normal command.

Accordingly, the first DRAM device 110 may determine whether or not the command refers to an address table (S720). For example, the first decoding logic circuit 252 of the C/A decoder 250 may identify whether the command refers to the address table—that is, whether the command is an index-based command—by identifying a field value indicating whether the command is a table-based command. For example, referring to FIG. 6, the first DRAM device 110 may receive the command "ACT" and identify a field indicating whether to refer to a table. When the field indicating whether to refer to the table is low (S720=NO), the first DRAM device 110 may identify that the command targets an address different from the address stored in the address table. Accordingly, the first DRAM device 110 may perform a method step corresponding to a specified command with respect to the address received through the C/A pin (S760).

However, upon determining that the command refers to an address table (S720=YES), the first DRAM device 110 may determine whether the command requires a row address (S730). Thus, when the field indicating whether to refer to the table is high (S720=YES), the DRAM device 110 may further determine whether the command requires the row address based on a type of the command (S730). For example, in the case of "ACT" for activating a specific row, the command may request a specific row address.

Accordingly, the first DRAM device 110 may obtain bank and row addresses corresponding to an index (S735) upon determining that the command requires only the row address (S730=YES). For example, when an index value is "1000", the first DRAM device 110 may identify an eighth index or a seventh index in the address table. The first DRAM device 110 may obtain bank and row addresses mapped to the eighth index. Thereafter, the first DRAM device 110 may perform method step S760 by considering the obtained bank and row addresses as addresses with respect to the command received in method step S710, and perform a method step corresponding to the requested command. For example, the first DRAM device 110 may activate the group, bank and row addresses corresponding to the eighth index in the address table.

Upon determining that the command does not require only a row address (S730=NO), the first DRAM device 110 may determine whether the command requires only a column address (S740). When the field indicating whether to refer to the table is high, the first DRAM device 110 may determine whether the command requires only the column address based on the type of the command. For example, in the case of "RD" for reading data or "WR" for writing data, the command may request the column address (S740=YES). Accordingly, the first DRAM device 110 may obtain a group, bank and column addresses corresponding to the index by referring to the address table (S745). For example, when the index value is "1001", the first DRAM device 110 may identify a ninth index or the eighth index in the address table. The first DRAM device 110 may obtain the group, bank and column addresses mapped to the ninth index. Thereafter, the first DRAM device 110 may perform method step S760 by considering the obtained group, bank and column addresses as addresses corresponding to the command received (S710), and perform a method step corresponding to the requested command. For example, the first DRAM device 110 may perform a data writing or a data reading with respect to the group, bank and column addresses corresponding to the ninth index in the address table.

Upon determining that the command does not require only a column address (S740=NO), the first DRAM device 110 may determine whether the command requires only a bank address (S750). When the field indicating whether to refer to the table is high, the first DRAM device 110 may determine whether the command requires the bank address based on the type of the command. For example, in the case of "PRE" for precharge, the command may request the bank address (S750=YES). Accordingly, the first DRAM device 110 may obtain a group and s bank address corresponding to the index by referring to the address table (S755). For example, when the index value is "0001", the first DRAM device 110 may identify a first index or a 0th index in the address table. The first DRAM device 110 may obtain a group and a bank address mapped to the first index. Thereafter, the first DRAM device 110 may perform method step S760 considering the obtained group and bank address as addresses for the received command (S710), and perform the requested command. For example, the first DRAM device 110 may precharge the group and bank address corresponding to the first index in the address table.

In the above-described embodiment, method steps S730, S740, and S750 are illustrated as being sequentially performed, but the scope of the inventive concept is not limited thereto. According to various embodiments, the first DRAM device 110 may performed any two or more of method steps S730, S740, and S750 in parallel (e.g., temporarily overlapping at least in part). For example, in response to identifying that the command is an index-based command that refers to the address table (S720=YES), the first DRAM device 110 may simultaneously determine whether the command requires only the row address (S730), whether the command requires only the column address (S740), and/or whether the command requires only the bank address (S750) by referring to a designation (e.g., an abbreviation (Abbr)) associated with the received command. To this end, the first DRAM device 110 may classify commands requesting the row address, commands requesting the column address, and commands requesting only the bank address, and store the commands in the form of a look-up table.

Figure 8B:
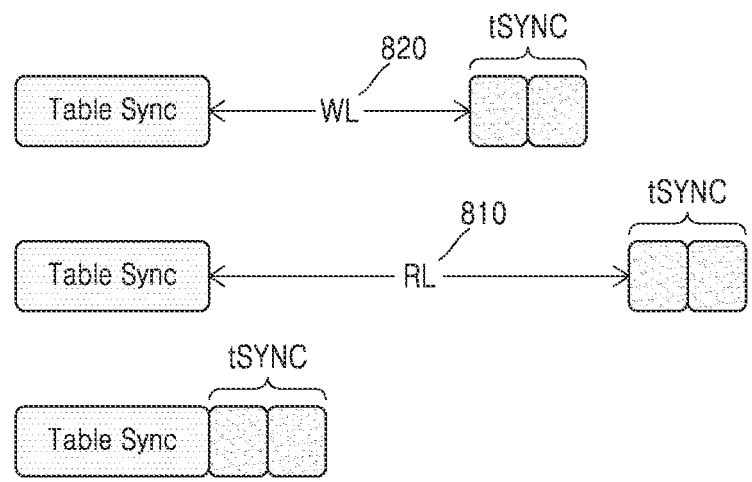
FIG. 8B illustrates an example of various latencies in some embodiments.

FIG. 8A is a conceptual diagram illustrating a table listing various latencies associated with table sync commands according to embodiments of the inventive concept, and FIG. 8B is a conceptual diagram further illustrating examples of same.

Referring to FIG. 8A, the table sync commands may classified as a table sync command with (w/) read latency (e.g., a latency about the same a delay time associated with a read command); a table sync command w/ write latency (e.g., a latency about the same a delay time associated with a write command); and a table sync w/ no latency (e.g., a minimal delay time). In this regard, the command generation circuit 220 may selectively apply a latency in order to minimize the time associated with turnaround related to another column access command and/or scheduling overhead. To this end, the command generation circuit 220 may variously indicate application of a selected latency by appropriately setting a latency field value corresponding to a command.

For example, the command generation circuit 220 may generate the table sync w/ read latency command and provide same to the first DRAM device 110. Accordingly, the table sync command w/ read latency may be used to indicate that data with respect to an address table is received after a first delay time, once the first DRAM device 110 receives the table sync command w/ read latency. This first delay time may correspond to an average time required to receive a read command to output corresponding read data. For example, referring to FIG. 8A, the first DRAM device 110 may identify a table sync command w/ read latency by referring to a latency identifier field value of "11".

Referring to FIG. 8B, the first delay time may correspond to a first time interval 810. Accordingly, communication of an address table to the first DRAM device 110 may be completed after tSYNC further elapses following the first delay time. Here, the period "tSYNC" may be understood as a time required for an encoded address table to be provided via a data bus. In some embodiments, the length of tSYNC may be variable according to the type of the table sync command. For example, the length of tSYNC may vary according to a field value indicating a partial table sync command. For example, the length of tSYNC corresponding to a low field value may be greater than the length of tSYNC corresponding to a high field value. This results follows, since the size of information required to update all indexes of the address table is greater than the size of information required to update only certain indexes of the address table. The length of tSYNC may additionally vary in relation to a magnitude of an offset value and/or whether a header indicating an index is communicated.

The memory controller 130 may generate a table sync command w/ read latency in accordance with various commands communicated before and/or after the generation of a table sync command. For example, when the first DRAM device 110 is assumed to be operating in a read major mode when a table sync command is generated, or when an additional read command is issued before or after the time at which the table sync command is generated, the memory controller 130 may issue the table sync command w/ read latency having the same latency as the additional read command in order to ensure gapless data communication.

In some embodiments, the command generation circuit 220 may generate and provide the table sync command w/ write latency to the first DRAM device 110. Here, the table sync command w/ write latency may serve as a notification that data associated with an address table will be communicated after a second delay time upon receipt by the first DRAM device 110 of the table sync command w/ write latency. The second delay time may correspond to a second time interval 820. In this regard, the second delay time may correspond to a time required for the write command to be received and corresponding write data communicated to the first DRAM device 110. The second delay time may be less than the first delay time. For example, the first DRAM device 110 may identify the received table sync command w/ write latency with reference to an identifier field value of "10". The memory controller 130 may generate the table sync command w/ write latency in consideration of various commands generated before and/or after the generation of the table sync command w/ write latency. For example, when the first DRAM device 110 is assumed to be operating in a write major mode at the time a table sync command w/ write latency is generated, or when write commands are issued before or after this time, the memory controller 130 may issue a table sync command w/ write latency having about the same latency as the write command in order to ensure gapless data communication.

In some embodiments, the command generation circuit 220 may generate and provide the table sync command w/ no latency to the first DRAM device 110. Here, the table sync command w/ no latency may serve as notification that data associated with an address table will be communicated after a third delay time after the first DRAM device 110 receives the table sync command w/ no latency. As noted above the third delay time should be a minimal delay time, but at a minimum the third delay time should be less than the first delay time and the second delay time. For example, the first DRAM device 110 may identify the table sync command w/ no latency with reference to a latency identifier field value of "01". The memory controller 130 may generate the table sync command w/ no latency in consideration of commands before and after the time at which the table sync command w/ no latency is generated. For example, when there is no command issued in relation to the first DRAM device 110 or when the first DRAM device 110 is currently in a standby mode, the memory controller 130 may issue the table sync command w/ no latency in order to achieve fast address table synchronization.

Figure 9A:
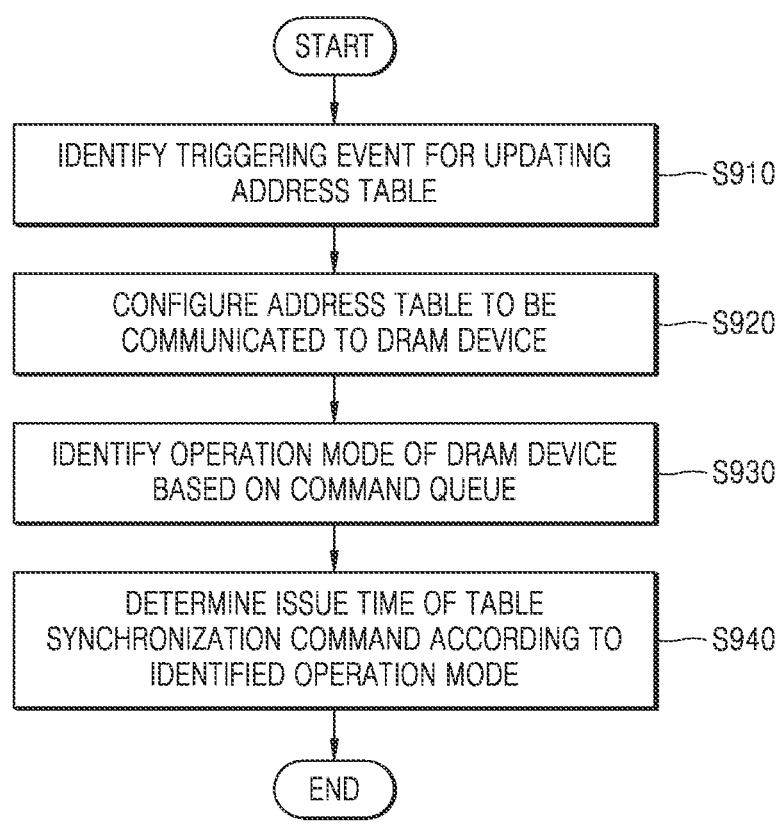
FIG. 9A is a flowchart an operating method of a scheduler in some embodiments.

FIG. 9A is a flowchart illustrating in one example an operating method for the scheduler 210 of FIG. 2, and FIGS. 9B, 9C and 9D are respective conceptual diagrams further illustrating examples of table synchronization commands having various latencies according to embodiments of the inventive concept.

Referring to FIGS. 2 and 9A, the scheduler 210 may identify a trigger event that results in an updating of an address table (S910). In some embodiments, the scheduler 210 may determine whether the trigger event occurs in relation to a data bus. For example, the scheduler 210 may monitor the data bus. The scheduler 210 may determine whether a data communication bubble may occur in relation to data being communicated to the first DRAM device 110 via the data bus. In this regard, the term "bubble" denotes a failure in maintaining gapless communication of write data due to a bandwidth deficiency associated with a C/A bus when a write command is communicated via the C/A bus. Alternately, the scheduler 210 may determine whether the data communication bubble may occur in relation to data being communicated from the DRAM device 110 via the data bus. In this regard, the bubble may refer to a failure in a gapless communication of read data due to bandwidth deficiencies associated with the C/A bus when a read command is transferred via the C/A bus. According to other embodiments, when identifying that bandwidth occupancy of the C/A bus exceeds a predefined threshold value, even before a bubble is identified, the scheduler 210 may identify a triggering event that causes an updating of an address table.

In response to the triggering event, the scheduler 210 may configure the address table to be communicated to the first DRAM device 110 (S920). The scheduler 210 may identify target commands from among a plurality of commands stored in a command queue, and configure addresses of the target commands into the address table. For example, the target commands may be commands that target an address not stored in the global table 140. For another example, the target commands may include target addresses of commands to be transferred to the first DRAM device 110 after a latency at which data obtained by encoding the address table is transferred to the first DRAM device 110.

The scheduler 210 may identify an operation mode of the DRAM device 110 based on the command queue (S930). The operation mode may include, for example, any one of a read major mode, a write major mode, and a no operation mode (NOP).

The scheduler 210 may then determine an issue time for the table synchronization command according to the identified operation mode (S940). In this manner, the scheduler 210 may differently set a time interval with a preceding command and a time interval with a succeeding command according to the identified operation mode.

Figure 9B:
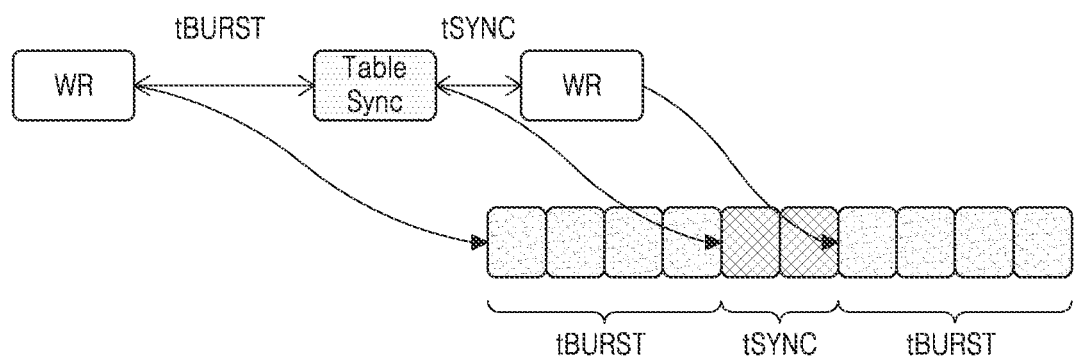
FIGS. 9B to 9D illustrate examples of table synchronization commands having various latencies in some embodiments.

Referring to FIG. 9B, the table synchronization command may be issued at an intermediate point in relation to a number of read commands. Because address table data is communicated to the first DRAM device 110 via the data bus after the table synchronization command, contention with other column access commands should be prevented on the data bus. For this, CAS-to-SYNC Delay may be set to a value equal to or more than at least tBURST, and SYNC-to-CAS Delay may be set to a value equal to or more than at least tSYNC. The table synchronization command may be understood as a kind of write command for transferring data from the memory controller 130 to the first DRAM device 110. Thus, when a transferred adjacent column access is a read command, an additional delay time may be necessary by a bus turnaround, and a preamble according to a read-write transition may be added to a delay time of the table synchronization command. That is, the interval between the preceding read command and the table synchronization command may be a value obtained by adding a time interval of the preamble to tBURST, and the interval between the table synchronization command and the succeeding read command may be a value obtained by adding the preamble to tSYNC.

Figure 9C:
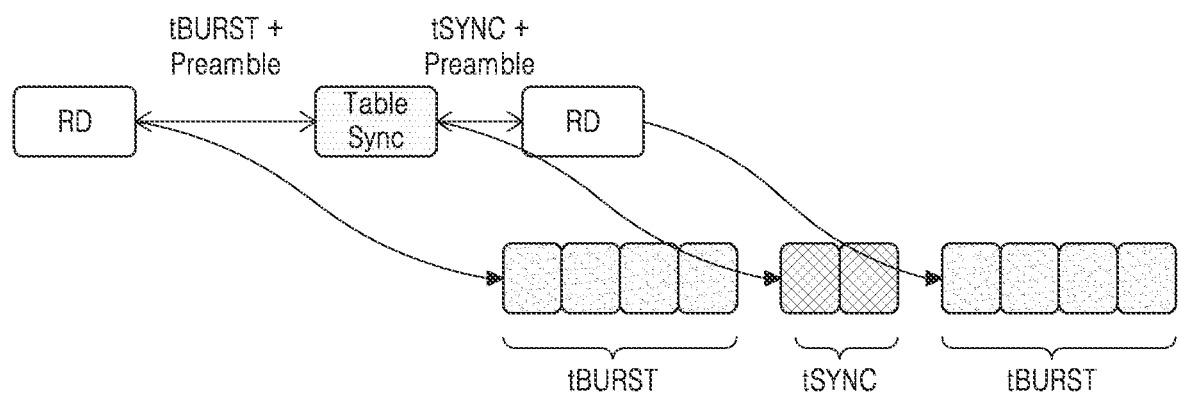

Referring to FIG. 9C, the table synchronization command may be issued at an intermediate point of write commands. Because the address table data is transferred to the DRAM device 110 via the data bus after the table synchronization command, the contention with other column access commands needs to be prevented on the data bus. For this, CAS-to-SYNC Delay may be set to a value equal to or more than at least tBURST, and SYNC-to-CAS Delay may be set to a value equal to or more than at least tSYNC. Accordingly, referring to FIG. 9B, the interval between the preceding write command and the table synchronization command may be tBURST, and the interval between the table synchronization command and the succeeding write command may be tSYNC.

Figure 9D:
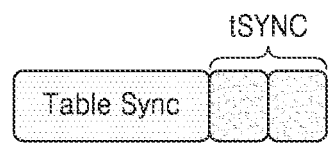

Referring to FIG. 9D, no command may be issued before and after the table synchronization command. That is, the memory controller 130 may issue a sixth table synchronization command having a minimum delay time because there is no preceding command or succeeding command causing congestion on the data bus.

Figure 10:
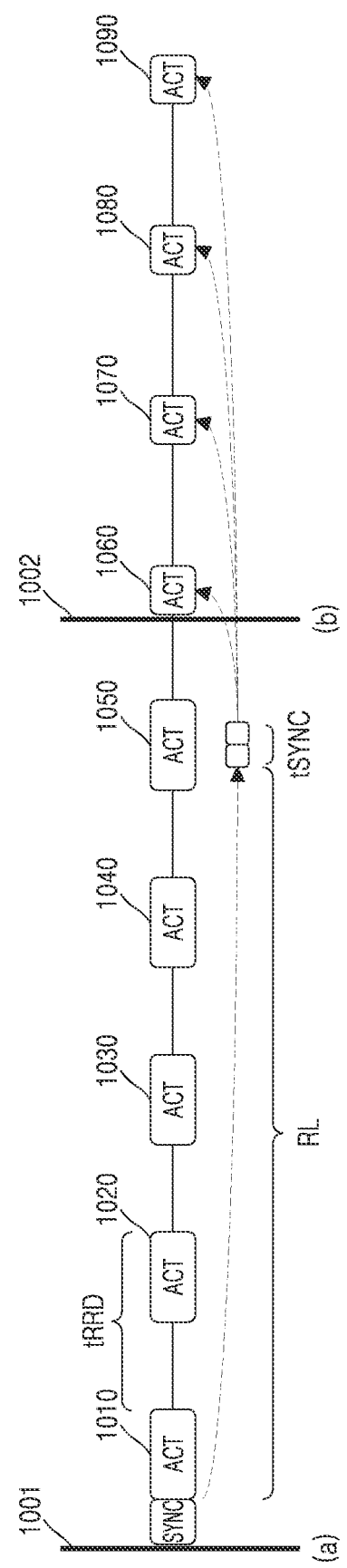
FIG. 10 illustrates an example of resolving a command/address bandwidth restriction in some embodiments.

FIG. 10 is a conceptual diagram illustrating one example of resolving C/A bandwidth restriction according to embodiments of the inventive concept.

Referring to FIGS. 2, 9A and 10, the memory controller 130 may identify a trigger event for updating an address table at time 1001 (a). For example, the memory controller 130 may identify 9 activation commands to be transferred to the first DRAM device 110 based on a command queue. The memory controller 130 may identify target addresses to constitute the address table based on a latency of a currently set table synchronization command. A latency identifier of the table synchronization command may be "11". The memory controller 130 may identify commands after the address table is communicated as target commands according to the latency of the table synchronization command. For example, the memory controller 130 may determine at time 1002 (b) at which transmission of the address table is completed based on the latency, and identify 4 activation commands 1060, 1070, 1080, and 1090 predicted to be issued after time 1002. Because a time spaced between commands due to timing restriction is at least tRRD in 5 activation commands 1010, 1020, 1030, 1040, and 1050 before the time 1002, so the 5 activation commands 1010, 1020, 1030, 1040, and 1050 may be issued to the first DRAM device 110 before the time 1002. Accordingly, the memory controller 130 may generate the address table including target addresses of the identified 4 activation commands 1060, 1070, 1080, and 1090. A time taken for the memory controller 130 to generate activation after the time 1002 may be reduced. Because the address table generated at time 1001 is stored in the first DRAM device 110, the memory controller 130 may not include all address information, but simply include and communicate index information only via a C/A bus. Thus, an issue time for an activation command may be reduced. Based on the command with a relatively short issue time, performance degradation due to a bandwidth deficiencies associated with a C/A bus may be prevented.

While the inventive concept has been particularly shown and described with reference to embodiments thereof, it will be understood that various changes in form and details may be made therein without departing from the scope of the inventive concept as defined by the following claims.

What is claimed is:

1. A memory device comprising:
a memory cell array; and
a command/address decoder including a buffer memory, a first decoding logic circuit configured to decrypt command/address information, and a second decoding logic circuit configured to decrypt an address table,
wherein the command/address decoder is configured to
decrypt a first command received from a memory controller through the first decoding logic circuit to obtain a table synchronization command,
decrypt data received from the memory controller, after a predefined latency from receipt of the first command, through the second decoding logic circuit to obtain the address table, the address table being configured to store an index mapped with address information of the memory device,
store the address table in the buffer memory,
decrypt a second command received from the memory controller through the first decoding logic circuit to obtain a table-based command and index information associated with the index of the address table, and
execute the table-based command with respect to an address corresponding to the index based on the index information.

2. The memory device of claim 1, wherein the first command and the second command are communicated to the memory device through a command/address pin, and
the data received after the predefined latency from the receipt of the first command is communicated to the memory device through a data pin.

3. The memory device of claim 2, wherein the data received from the memory controller after the predefined latency from receipt of the first command is generated by the memory controller by encoding an address table to be stored in the buffer memory.

4. The memory device of claim 2, further comprising:
a multiplexer/demultiplexer configured to receive data from the first decoding logic circuit and further configured to exchange data with the buffer memory and the data pin.

5. The memory device of claim 1, wherein the address table is a sub-table particularly associated with the memory device and corresponding to a global address table referenced by the memory controller.

6. The memory device of claim 1, wherein decrypting the first command generates a table synchronization command, and the table synchronization command includes:
a first field indicating whether the table synchronization command is a full table synchronization command or a partial table synchronization command; and
a second field indicating whether offset information is included in the table synchronization command.

7. The memory device of claim 6, wherein the first field includes a single bit,
a logical low value for the first field indicates the full table synchronization command, and
a logical high value for the first field indicates the partial table synchronization command.

8. The memory device of claim 7, wherein the table synchronization command further includes a third field indicating a latency from a time at which the table synchronization command is received to another time at which the data is received.

9. An operating method for a memory device, the operating method comprising:
receiving a first command from a memory controller;
decrypting the first command to obtain a table synchronization command;
decrypting data received from the memory controller after a predefined latency from receipt of the first command to obtain an address table, the address table being configured to store an index mapped with address information of the memory device;
storing the address table in a buffer memory;
receiving a second command from the memory controller;
decrypting the second command to obtain a table-based command and corresponding index information associated with the index of the address table; and
executing the table-based command with respect to an address corresponding to the index based on the index information.

10. The operating method of claim 9, wherein the first command and the second command are communicated to the memory device from a memory controller through a command/address pin, and the data is communicated from the memory controller to the memory device through a data pin.

11. The operating method of claim 9, wherein the table synchronization command includes:
   a first field indicating whether the table synchronization command is a full table synchronization command or a partial table synchronization command;
   a second field indicating whether the table synchronization command includes offset information; and
   a third field indicating a latency from a time at which the table synchronization command is received to another time at which the data is received.

12. The operating method of claim 9, further comprising:
   determining a type of the table-based command; and
   obtaining at least one of a bank, a row address, and a column address corresponding to the index information and in accordance with the type of the table-based command.

13. The operating method of claim 12, wherein the obtaining of the at least one of a bank, a row address, and a column address corresponding to the index information and in accordance with the type of the table-based command includes obtaining a bank and a row address corresponding to the index information if the table-based command is an activation command.

14. The operating method of claim 12, wherein the obtaining of the at least one of a bank, a row address, and a column address corresponding to the index information and in accordance with the type of the table-based command includes obtaining a bank, a row address, and a column address corresponding to the index information if the table-based command is a read command or a write command.

15. The operating method of claim 12, wherein the obtaining of the at least one of a bank, a row address, and a column address corresponding to the index information and in accordance with the type of the table-based command includes obtaining a bank corresponding to the index information if the table-based command is a precharge command.

* * * * *